(12) United States Patent
Anderson et al.

(10) Patent No.: US 7,558,226 B2
(45) Date of Patent: Jul. 7, 2009

(54) PERFORMING AN IDLE MODE HANDOFF IN A WIRELESS COMMUNICATION DEVICE

(75) Inventors: Jon J. Anderson, Boulder, CO (US);
Francis Ngai, Louisville, CO (US);
Glenn Salaman, Boulder, CO (US);
Nicholson R. Gibson, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 192 days.

(21) Appl. No.: 10/271,686

(22) Filed: Oct. 15, 2002

(65) Prior Publication Data

US 2003/0103479 A1    Jun. 5, 2003

Related U.S. Application Data

(60) Provisional application No. 60/332,492, filed on Nov. 16, 2001.

(51) Int. Cl.
*G06C 17/00* (2006.01)
*H04W 4/00* (2006.01)
*H04W 36/00* (2009.01)
*H04B 7/216* (2006.01)

(52) U.S. Cl. ........................ 370/311; 370/328; 370/342; 455/436

(58) Field of Classification Search ................. 370/311, 370/328, 342, 479; 455/422.1, 436–444
See application file for complete search history.

(56) References Cited

U.S. PATENT DOCUMENTS

| 4,901,307 | A | 2/1990 | Gilhousen et al. | |
| 5,987,012 | A | 11/1999 | Bruckert et al. | 370/331 |
| 2001/0024429 | A1* | 9/2001 | Sekine et al. | 370/331 |
| 2003/0086395 | A1* | 5/2003 | Shanbhag | 370/331 |

FOREIGN PATENT DOCUMENTS

| EP | 0808034 A2 | 11/1997 |
| JP | 10-108267 | 4/1998 |
| JP | 2000-315975 | 11/2000 |
| JP | 2004-504783 | 2/2004 |
| WO | 0027158 A1 | 5/2000 |
| WO | WO0176313 | 2/2001 |

OTHER PUBLICATIONS

International Search Report—PCT/US02/36780, International Search Authority—European Patent Office—Jul. 3, 2003.

* cited by examiner

*Primary Examiner*—Kevin C Harper
(74) *Attorney, Agent, or Firm*—Abdollah Katbab; Darren M. Simon

(57) ABSTRACT

A Wireless Communication Device (WCD) inter-operates with a Code Division Multiple Access (CDMA) communication system. The WCD operates in an idle mode wherein the WCD transitions between a sleep state to conserve power and an awake state to receive one or more paging signals. The WCD attempts to reacquire a first pilot signal associated with a first paging signal that was previously being demodulated, and a second pilot signal that was previously being tracked. The WCD performs a handoff from the first paging signal to a second paging signal associated with the second pilot signal when the attempt to reacquire the first pilot signal fails and the attempt to reacquire the second pilot signal is successful.

23 Claims, 7 Drawing Sheets

PERFORMING AN IDLE MODE HANDOFF IN A WIRELESS COMMUNICATION DEVICE

RELATED APPLICATIONS

This application claims priority from U.S. Provisional Patent Application entitled "Method and System for Performing an Idle Mode Handoff in a Wireless Communication Device," Ser. No. 60/332,492, filed Nov. 16, 2001, which application is incorporated herein by reference in its entirety.

BACKGROUND OF THE INVENTION

I. Field of the Invention

The present invention relates generally to wireless communication devices (WCDs), and more particularly, to a wireless communication device (WCD) capable of performing a handoff between different paging signals when operating in a paging environment.

II. Related Art

In a terrestrial communication environment, a WCD can receive communication signals from a plurality of geographically distributed base stations. In a satellite-based communication system, the WCD can receive communication signals associated with a plurality of different satellite beams of one or more satellites. The WCD exchanges signals, referred to as traffic channel signals, with the base stations and/or satellites when engaged in a call, maintaining a communication link. While engaged in the call, the WCD can handoff between different base stations and/or satellite beams using known techniques, thereby maintaining seamless call coverage as the WCD moves relative to the base stations and/or satellite beams.

When the WCD is not engaged in a call or an active communication link, the WCD can operate in an idle state or mode to conserve resources. When in that mode, the WCD can operate in a paging mode. In the paging mode, the WCD has the option of entering and then remaining in a power-conserving sleep state during relatively long periods of time. The WCD periodically transitions from the sleep state to an awake state for a relatively short period of time to monitor paging signals transmitted from the base stations and/or associated with the satellite beams.

Often, the WCD may not be able to receive a paging signal associated with a base station or satellite beam because of a signal blockage, or because the WCD has moved out-of-range with respect to a coverage zone (often referred to as a cell) associated with the base station or one or more satellite beams. In either case, it is desirable for the WCD to maintain seamless paging coverage.

When the WCD is idle, the paging mode provides a mechanism for delivering messages to the WCD over a paging channel, while enabling the WCD to use the sleep state to reduce power consumption. There is a general need to use improved techniques for further reducing power consumption in the WCD while the WCD is idle, and operating in the paging mode.

SUMMARY OF THE INVENTION

A feature of the present invention is to provide seamless paging coverage for or with a WCD operating in a paging mode. The WCD is able to concurrently monitor/process alternative paging signals associated with multiple base stations and/or satellite beams, whereby the WCD can provide seamless paging coverage during degraded signal conditions, such as during paging signal blockages, or when the WCD moves between coverage zones or regions associated with multiple base stations and/or satellite beams. The WCD achieves seamless paging coverage through the use of a handoff in the WCD from a first paging signal associated with a first base station and/or satellite beam to a second paging signal associated with a second base station and/or satellite beam.

Another feature of the present invention is to provide such seamless paging coverage while reducing power consumption in the WCD.

One embodiment of the present invention is a method of performing a handoff operation in a WCD operating in a communication system. The WCD operates in an idle mode wherein the WCD transitions between a sleep state to conserve power and an awake state to receive one or more paging signals. The method comprises attempting to reacquire a first pilot signal associated with a first paging signal that was being demodulated during a previous awake state, and attempting to reacquire a second pilot signal that was being tracked during the previous awake state. The method also comprises performing a handoff from the first paging signal to a second paging signal associated with the second pilot signal when the attempt to reacquire the first pilot signal fails and the attempt to reacquire the second pilot signal is successful. The method also comprises demodulating the second paging signal during a current awake state, as a result of the handoff operation. Apparatus is provided for performing the method steps of the above-described embodiment.

In further aspects of the invention, the WCD transitions from the previous awake state to a previous sleep state before attempting to reacquire the first pilot signal, and performs the attempt to reacquire and handoff steps while transitioning from the previous sleep state to the current awake state. The WCD includes a receiver that is configured to demodulate the first paging signal during the previous awake state, which is reconfigured to demodulate the second paging signal, as appropriate. Generally, the first and second paging signals are slotted paging signals associated with a predetermined cycle of time slots, and the step of transitioning from the previous sleep state to the current awake state comprises transitioning to the current awake state so that the current awake state overlaps in time with a time slot of the cycle of time slots that is assigned to the WCD.

When the communication system is a CDMA communication system, the first and second pilot signals are spread using first and second codes, the second code being either a different code from the first code or a time shifted version of the first code. In this case, reacquiring the first pilot comprises attempting to reacquire the first pilot signal using the first code; and reacquiring the second pilot comprises attempting to reacquire the second pilot signal using the second code. Alternatively, the second paging signal is spread using a third code related to the second code, and performing a handoff from the first paging signal to a second paging signal comprises demodulating the second paging signal using the third code.

Apparatus is provided for performing a handoff operation in a WCD which is capable of operating in an idle mode and making transitions between a sleep state to conserve power and an awake state to receive one or more paging signals. The apparatus comprises first means for attempting to reacquire a first pilot signal associated with a first paging signal that was being demodulated during a previous awake state; second means for attempting to reacquire a second pilot signal that was being tracked during the previous awake state; third means for performing a handoff operation from the first paging signal to a second paging signal associated with the second pilot signal when the attempt to reacquire the first pilot signal fails and the attempt to reacquire the second pilot signal is successful; and fourth means for demodulating the second paging signal during a current awake state, as a result of the handoff operation. The first, second and third means perform their respective functions while the WCD is transitioning from a previous sleep state to the current awake state.

In further aspects of the apparatus, the first and second paging signals are slotted paging signals associated with a predetermined cycle of time slots, and the WCD transitions from the previous sleep state to the current awake state so that the current awake state overlaps in time with a time slot of the cycle of time slots that is assigned to the WCD.

When the communication system is a CDMA communication system, the first pilot signal is spread using a first code and the second pilot signal is spread using a second code, with the second code being either a different code from the first code or a time shifted version of the first code, and the first means includes means for attempting to reacquire the first pilot signal using the first code, while the second means includes means for attempting to reacquire the second pilot signal using the second code. Furthermore, the second paging signal is spread using a third code related to the second code, and the fourth means includes means for demodulating the second paging signal using the third code.

A method of performing a handoff operation in a WCD operating in an idle mode according to a second embodiment comprises determining during an awake state that a handoff from a first paging signal to a second paging signal is required, for example when the second power level is greater than the first power level by a predetermined amount; determining during the awake state whether or not to postpone the handoff until a next awake state; and transitioning from the awake state to a sleep state without performing the required handoff when it is determined to postpone the handoff. The method also comprises performing the required handoff from the first paging signal to the second paging signal when the WCD transitions from the sleep state to a next awake state. Apparatus is also provided for performing the method steps of the second embodiment.

In further aspects, the method comprises performing the required handoff from the first paging to the second paging signal after the WCD transitions from the sleep state to the next awake state; and demodulating the second paging signal during the next awake state as a result of doing so. In a CDMA system the second paging signal is a spread spectrum signal, and demodulating comprises despreading the second paging signal using a code. In addition, it can be determined whether or not a paging slot message associated with the paging signal has been demodulated; and transition from the awake state to the sleep state without performing the required handoff when it is determined that the paging slot message associated with the paging signal has been demodulated. A first power level of a first pilot signal associated with the first paging signal and a second power level of a second pilot signal associated with the second paging signal can be monitored before determining that a handoff from a first paging signal to a second paging signal is required, by determining that the handoff is required based on the first and second power levels.

In other embodiments, the WCD is scheduled to transition from the awake state to the sleep state at a scheduled time, and determining at a first time during the awake state that the handoff is required; determining whether the first time precedes the scheduled time by less than a predetermined time period; and transitioning from the awake state to the sleep state at the scheduled time without performing the required handoff when it is determined that the first time precedes the scheduled time by less than the predetermined time period. Generally, the predetermined time period is less than a time period required to perform the required handoff.

Apparatus for performing a handoff operation in a WCD operating in an idle mode and making transitions between a sleep state to conserve power and an awake state to receive one or more paging signals, comprises first means for determining during an awake state that a handoff from a first paging signal to a second paging signal is required; second means for determining during the awake state whether to postpone the handoff until a next awake state; and third means for transitioning from the awake state to a sleep state without performing the required handoff when it is determined to postpone the handoff.

In further embodiments, the apparatus comprises fourth means for performing the required handoff from the first paging signal to the second paging signal after the WCD transitions from the sleep state to a next awake state, and fifth means for demodulating the second paging signal during the next awake state. When the communication system is a CDMA communication system, and the second paging signal is a spread spectrum signal, the fifth means comprises means for despreading the second paging signal using a code. The apparatus can further comprise means for monitoring a first power level of a first pilot signal associated with the first paging signal and a second power level of a second pilot signal associated with the second paging signal, and the first means includes means for determining the handoff is required based on the first and second power levels. The first means further includes means for determining the handoff is required when the second power level is greater than the first power level by a predetermined amount.

In some embodiments, the WCD is scheduled to transition from the awake state to the sleep state at a scheduled time, and the first means comprises means for determining at a first time during the awake state that the handoff is required; the second means comprises means for determining whether the first time precedes the scheduled time by less than a predetermined time period; and the third means comprises means for transitioning from the awake state to the sleep state at the scheduled time without performing the required handoff when it is determined that the first time precedes the scheduled time by less than the predetermined time period. Furthermore, the predetermined time period is less than a time period required to perform the required handoff. The second means can have means for determining whether a paging slot message associated with the paging signal has been demodulated, while the third means comprises means for transitioning from the awake state to the sleep state without performing the required handoff when it is determined that the paging slot message associated with the paging signal has been demodulated.

In another embodiment, apparatus for performing a handoff operation in a WCD operating in an idle mode to transition between a sleep state and an awake state to receive one or more paging signals, comprises a demodulator, a first finger, a second finger, a searcher, and a controller. The controller is responsive to the searcher and is adapted to reconfigure the demodulator to demodulate the second paging signal when the searcher indicates the attempt to reacquire the first pilot signal has failed and the attempt to reacquire the second pilot signal has succeeded. The searcher is adapted to attempt to reacquire a first pilot signal associated with a first paging signal that was being demodulated by the demodulator and tracked using the first finger during a previous awake state of the WCD, and to attempt to reacquire a second pilot signal that was being tracked by the second finger during the previous awake state.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein.

DETAILED DESCRIPTION OF THE INVENTION

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title "Spread Spectrum Multiple Access Communication System Using Satellite or Terrestrial Repeaters," which is incorporated herein by reference.

While basic CDMA mobile communication techniques are standardized in the United States by the Telecommunications Industry Association in TIA/EIA/IS-95-A generally referred to as IS-95, other communications systems are described in the IMT-2000/UM, or International Mobile Telecommunications System 2000/Universal Mobile Telecommunications System, standards covering what are referred to as wideband CDMA (WCDMA), cdma2000 (such as cdma2000 1x or 3x standards, for example) or TD-SCDMA.

I. Example Communication Environment

Figure 1:
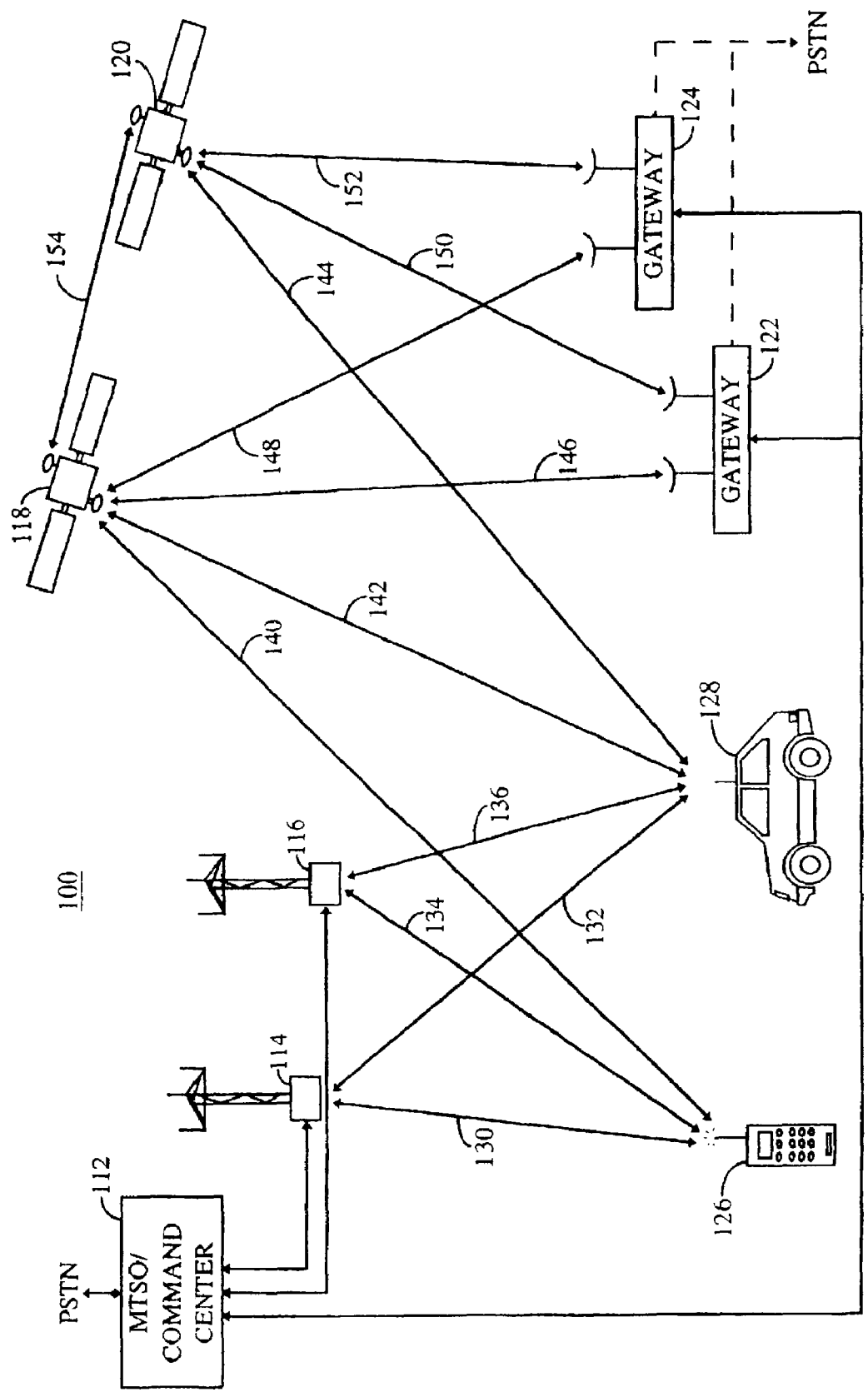
FIG. 1 is an illustration of an example wireless communication system.

FIG. 1 is an example of a wireless communication system constructed and operated according to the embodiments of the invention. A communication system 100 utilizes spread spectrum modulation techniques in communicating with WCDs 126 and 128 (also referred to as mobile stations and user terminals). Communication system 100 can use spectrum modulation techniques as set forth in U.S. Pat. No. 4,901,307, mentioned above.

In terrestrial systems, communication system 100 communicates with WCDs 126 and 128 using base stations (shown as base stations 114 and 116).

In satellite-based systems, communication system 100 employs satellite repeaters (shown as satellites 118 and 120) and system gateways (shown as gateways 122 and 124) to communicate with WCDs 126 and 128. Gateways 122 and 124 send communication signals to WCDs 126 and 128 through satellites 118 and 120.

Mobile stations or WCDs 126 and 128 each have or comprise a wireless communication component/device such as, but not limited to, a cellular telephone, wireless handset, a data transceiver, a paging or position determination receiver, or a transfer device (e.g., computers, personal data assistants, facsimile). Typically, such units are either handheld or portable as in vehicle-mounted (including for example cars, trucks, boats, trains, and planes), as desired. While these WCDs are discussed as being mobile, it is also understood that the teachings of the invention are applicable to fixed units or other types of terminals where remote wireless service is desired. This latter type of service is particularly suited to using satellite repeaters to establish communication links in many remote areas of the world. WCDs are also sometimes referred to as subscriber units, mobile units, mobile stations, user terminals, wireless units, or simply as "users," "mobiles," "subscribers," or "terminals" in some communication systems, depending on preference.

It is contemplated for this example that satellites 118 and 120 provide multiple beams within "footprints" that are directed to cover separate generally non-overlapping geographic regions. Generally, multiple beams at different frequencies, also referred to as CDMA channels, "sub-beams" or frequency division multiplexed (FDM) signals, frequency slots, or channels, can be directed to overlap the same region. However, it is readily understood that the beam coverage or service areas for different satellites, or antenna patterns for terrestrial cell-sites, may overlap completely or partially in a given region depending on the communication system design and the type of service being offered. Space diversity may also be achieved between any of these communication regions or devices. For example, each may provide service to different sets of users with different features at different frequencies, or a given mobile unit may use multiple frequencies and/or multiple service providers, each with overlapping geophysical coverage.

As illustrated in FIG. 1, communication system 100 generally uses a system controller and switch network 112, also referred to as a mobile telephone switching office (MTSO), in terrestrial systems and (Ground) Command and Control centers (GOCC) for satellite systems, which also communicate with the satellites. Such controllers typically include interface and processing circuitry for providing system-wide control for base stations 114 and 116 or gateways 122 and 124 over certain operations including pseudo-noise (PN) code generation, assignments, and timing. Controller 112 also controls routing of communication links or telephone calls among a public switched telephone network (PSTN), and base stations 114 and 116 or gateways 122 and 124, and WCD 126 and 128. A PSTN interface generally forms part of each gateway for direct connection to such communication networks or links.

The communication links that couple controller 112 to various system base stations 114 and 116 or gateways 122 and 124 can be established using known techniques such as, but not limited to, dedicated telephone lines, optical fiber links, and microwave or dedicated satellite communications links.

While only two satellites are illustrated in FIG. 1, the communication system generally employs multiple satellites 118 and 120 traversing different orbital planes. A variety of multi-satellite communication systems have been proposed including those using a constellation of Low Earth Orbit (LEO) satellites for servicing a large number of WCDs. However, those skilled in the art will readily understand how the teachings of the present invention are applicable to a variety of both terrestrial and satellite system configurations.

In FIG. 1, some of the possible signal paths for communication links between base stations 114 and 116 and WCDs 126 and 128 are illustrated as lines 130, 132, 134, and 136. The arrowheads on these lines illustrate exemplary signal directions for the link, as being either a forward or a reverse link, and serve as illustration only for purposes of clarity and not as any restriction on the actual signal pattern.

In a similar manner, signal paths for communication links among gateways 122 and 124, satellite repeaters 118 and 120, and WCDs 126 and 128 are illustrated as lines 146, 148, 150, and 152 for gateway-to-satellite links and as lines 140, 142, and 144 for satellite-to-user links. In some configurations, it may also be possible and desirable to establish direct satellite-to-satellite links exemplified by line 154.

As will be apparent to one skilled in the art, the present invention is suited for either terrestrial-based systems or satellite-based systems. The terms base station and gateway are sometimes used interchangeably in the art, with gateways being perceived as specialized base stations that direct communications through satellites. Likewise, satellites 118 and 120 will be collectively referred to as satellite 118, and WCDs 126 and 128 will be collectively referred to as WCD 128.

II. Signal Links

Each of the signal paths or links 130-152 depicted in FIG. 1 typically includes both a forward link and a reverse link. Each of the forward links delivers a set of forward link signals transmitted by base stations and gateways 114, 116, 122 and 124 to WCDs 126 and 128. Conversely, each of the reverse links delivers a set of reverse link signals transmitted by WCDs 126 and 128 to base stations and gateways 114, 116, 122 and 124. In the terrestrial environment, each of the base stations 114, 116 transmits a set of forward link signals.

In the satellite environment, each of the gateways 122, 124 transmits multiple sets of forward link signals. That is, a forward link is divided into multiple (for example, 8 or 16) beams, where each beam is further sub-divided into multiple (for example, 13) sub-beams. Each set of forward link signals is associated with a different one of the multiple sub-beams mentioned above, or each sub-beam is associated with a set of forward link signals. Therefore, satellites 118, 120 each transfers multiple sub-beams (that is, multiple sets of forward link signals) to the surface of the earth.

Figure 2:
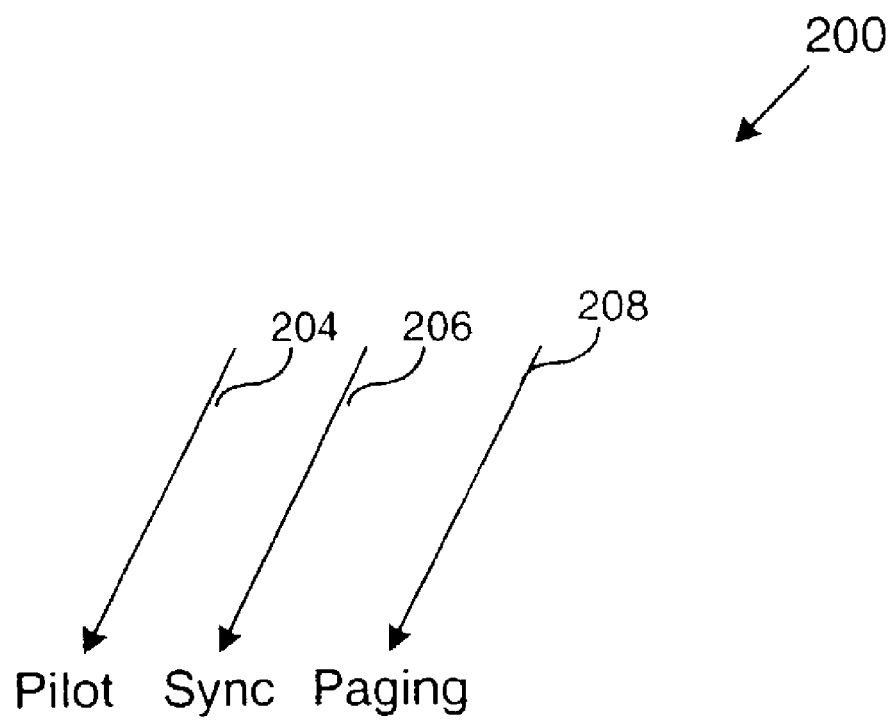
FIG. 2 is an illustration of an exemplary set of forward link signals delivered to a WCD of FIG. 1.
Figure 2:
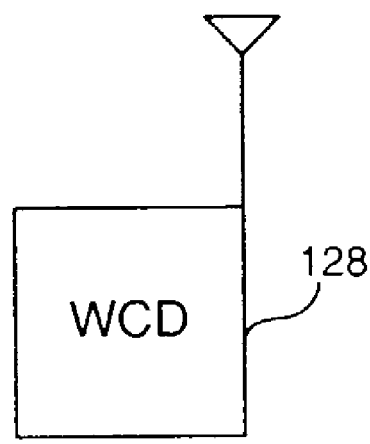

FIG. 2 is an illustration of an exemplary set of forward link signals 200 delivered to WCD 128. In the terrestrial environment, forward link signals 200 are transmitted from a base station (for example, base station 114 or 116). In the satellite environment, forward link signals 200 are transmitted up to a satellite (for example, satellite 118 or 120) and then down from the satellite to a WCD (for example, WCD 126 or 128) over a particular sub-beam. Forward link signals 200 include one or more of the following signals: a pilot signal 204; a synchronization (sync) signal 206 associated with the pilot signal; and a paging signal 208 associated with the pilot signal. The forward link may also include additional signals, such as traffic signals, that do not form a required part of the embodiment, and are, therefore, not discussed further. Pilot signal 204, sync signal 206, paging signal 208, and the traffic signals are also referred to in the art as pilot channel signal 204, sync channel signal 206, paging channel signal 208, and traffic channel signals, respectively.

In the terrestrial environment, each base station transmits a respective pilot signal (for example, pilot signal 204). The pilot signal is used by the WCDs (for example, WCD 128) to acquire initial system synchronization and to provide robust time, frequency, and phase tracking of the other forward link signals transmitted by the base station. The pilot signal transmitted by each base station uses a common spreading code, such as a PN sequence, but a different code phase offset (for example, a different time offset), thereby enabling the WCD to distinguish between the pilot signals transmitted from respective base stations.

Similarly, in the satellite environment, each satellite, and/or each gateway, can be associated with a predetermined code, such as a PN sequence, which may be the same or different from the codes associated with the other satellites (gateways). Each beam associated with a given satellite includes a pilot signal that is spread using the predetermined code for the given satellite, but having a different phase code offset from the other beams. Therefore, a WCD can distinguish between the beams associated with the given satellite, and also between different satellites.

Sync signal 206 is a modulated spread spectrum signal, including system timing messages used by WCD 128 to acquire an overall communication system time associated with communication system 100. Sync signal 206 is spread using a code, such as PN code, that is related to the code used to spread associated pilot signal 204. Once pilot signal 206 has been acquired by WCD 128, the WCD acquires sync signal 206, thereby permitting the WCD to synchronize timing internal to the WCD with the overall system time. Alternatively, a timing difference can be stored and used to correct subsequent processing, such as coding, or signal transmission timing.

Paging signal 208 is a modulated spread spectrum signal used to deliver messages to WCDs. Paging signal 208 is spread using a code, such as a PN code, that is related to the code used to spread associated pilot signal 204. For descriptive convenience, the discussion above associates only one code with each of the sync, pilot and paging signals. However it is to be understood that one or more codes (for example, a set of codes) is typically used to spread and/or channelize each of these signals, and that the set of codes associated with each signal is also used to synchronize with, despread, and de-channelize that signal. Once WCD 128 is synchronized with system time, it can monitor paging signal 208. Communication system 100 and WCD 128 can operate in a slotted paging mode using paging signal 208, as is described in further detail below.

III. WCD Receiver

Figure 3:
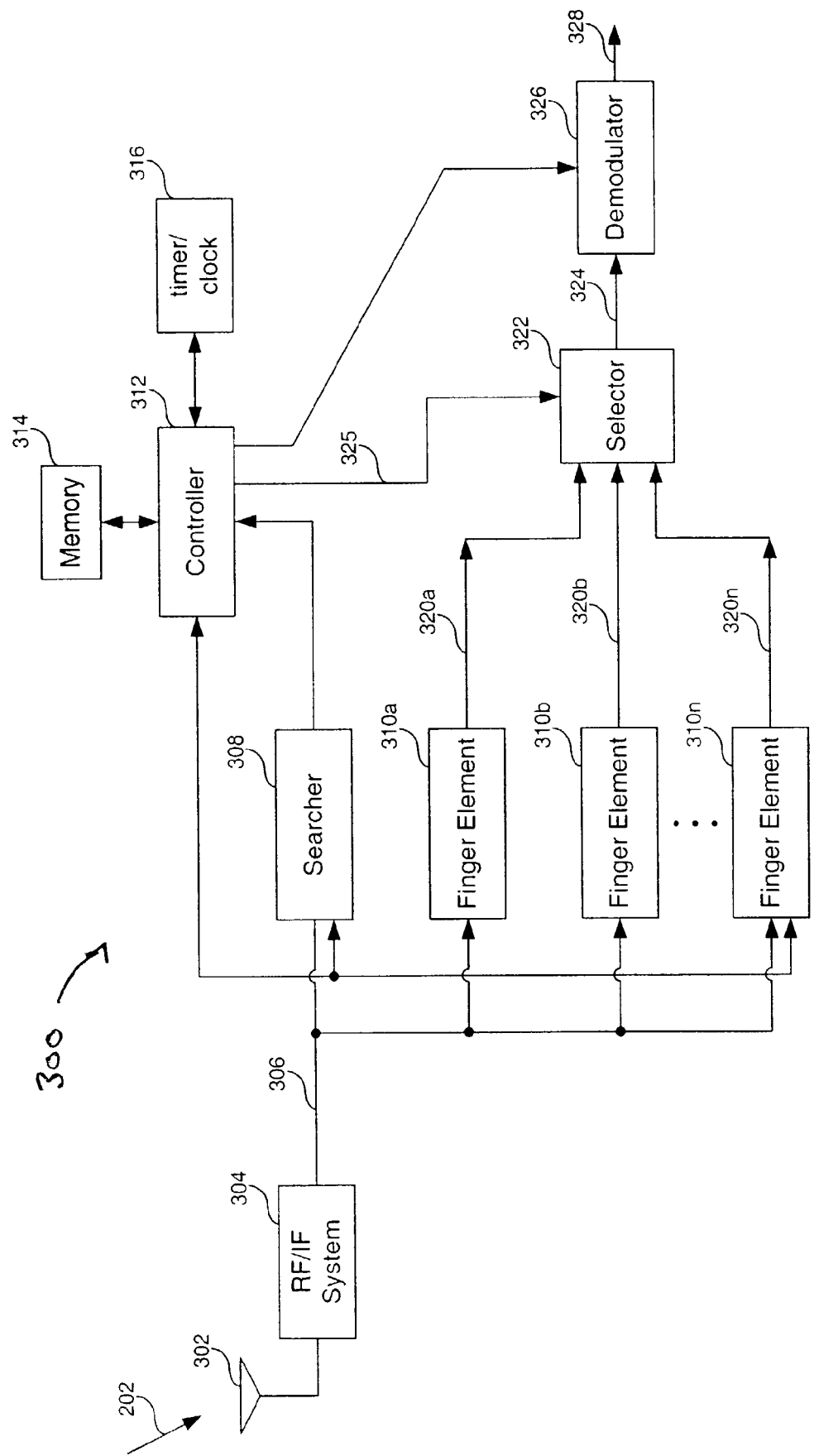
FIG. 3 is a block diagram of an example receiver of the WCD of FIG. 1, for processing code division multiple access (CDMA) signals used in the system of FIG. 1.

FIG. 3 is a block diagram of an example receiver 300 of WCD 128 for processing CDMA signals used in system 100. Receiver 300 includes an antenna system 302 for receiving forward link radio frequency (RF) signals (such as pilot, sync, and paging signals 204, 206 and 208), and for delivering the signals to an RF/intermediate frequency (IF) system 304. RF/IF system 304 filters, frequency-downconverts and digitizes the RF signals, and delivers a resulting digitized signal 306 to a searcher unit 308 and a plurality of receiver fingers or finger elements 310a ... 310n. Searcher 308 searches for and detects/acquires pilot signals included in digitized signal 306, and reports search results to a controller 312 coupled to the searcher and the finger elements 310. Typically, controller 312 includes a processor controlled by software, and is coupled to a memory 314. Controller 312 is also coupled to a counter/timer 316 used to maintain time in receiver 300.

Based on the search/signal acquisition results reported by searcher 308, controller 312 configures each of finger elements 310 to track and at least partially despread various ones of the forward link signals (such as one or more paging signals) most likely being received by receiver 300 at any given time. Controller 312 can configure a finger to track a signal by providing to the finger a code (referred to as a designated code) that the finger uses to despread the signal to be tracked (also referred to as the designated signal), and a code offset of the designated signal. The designated code was used at the gateway to initially spread the designated signal.

Finger elements 310 deliver respective despread signals 320a-320n (for example, despread paging signals) to a selector/multiplexer 322 controlled by controller 312. In accordance with a command 325 from controller 312, selector 322 routes a selected one of the despread signals 320 (designated as signal 324 in FIG. 3) to a demodulator 326. Controller 312 configures demodulator 326 to demodulate the designated signal, for example, by providing the demodulator with a code associated with the signal, and timing information related to the code phase offset of the signal to be demodulated. In response, demodulator 326 demodulates selected, despread signal 324, to produce a demodulated signal 328 (such as a demodulated paging signal). Demodulator 326 provides demodulated signal 328 to controller 312.

In an alternative arrangement of receiver 300, each of the fingers 310 includes demodulator functionality, whereby each finger can both track and demodulate a respective signal. In this arrangement, separate demodulator 326 is omitted, and selector 322 is modified to selectively route one of the finger outputs 320 to controller 312. In another alternative arrangement of receiver 300, searcher 308 includes both tracking and limited demodulating capability.

IV. Slotted Paging Operation

As mentioned above, communication system 100 can use paging signal 208 when operating in the slotted paging environment. In the slotted paging environment, WCD 128 operates in a slotted paging mode, as mentioned above. Examples of using slotted paging are shown in U.S. Pat. No. 6,101,173 entitled "*Adaptive Reacquisition Time In A Slotted Paging Environment,*" and U.S. Pat. No. 6,167,056 entitled "*Access Channel Slot Sharing,*" both of which are assigned to the assignee of the present invention, and incorporated herein by reference.

Figure 4:
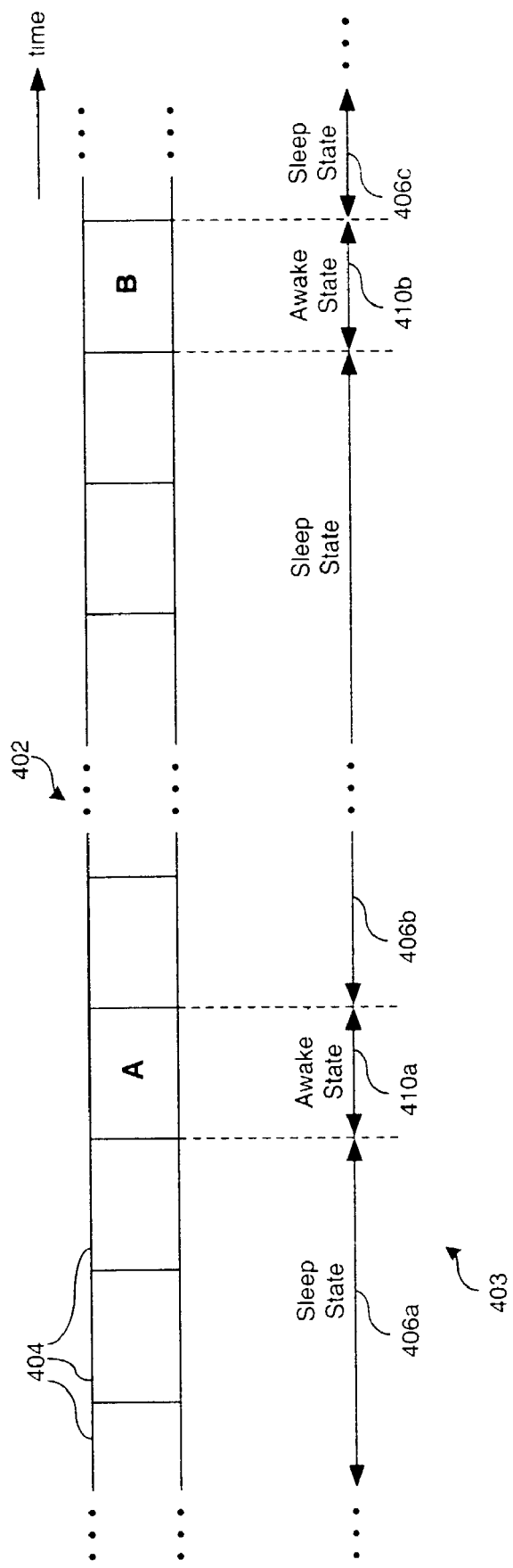
FIG. 4 is an illustration of several example timelines useful in describing an exemplary operation of the WCD of FIG. 1 while in a slotted paging mode.

FIG. 4 is an illustration of several example timelines useful in describing an exemplary operation of WCD 128 while in the slotted paging mode. Depicted in FIG. 4 is an example timeline 402 representing a portion of paging signal 208. Also depicted in FIG. 4 is an example timeline 403 corresponding to timeline 402. Timeline 403 represents time periods corresponding to various operating states of WCD 128 during the slotted paging mode. Paging signal 208 (also referred to as slotted paging signal 208) is time-divided into a repeating cycle of time slots 404, as depicted in FIG. 4. Each WCD within listening range of paging signal 208 (for example, WCD 128) is assigned to monitor typically only one time slot in each of the cycle of slots. A gateway can transmit messages to an intended WCD during the time slot assigned to that WCD. In FIG. 4, an example slot A represents such an assigned time slot during a first (or previous) cycle of the time slots, while an example slot B represents an assigned slot during a second (or current) cycle of the time slots.

WCD 128 monitors the assigned or designated slots (for example, slots A and B) of paging signal 208 while the WCD is in an "idle" mode. The WCD is considered to be in the idle mode when it has acquired a communication system, is synchronized with system time in the communication system, and is thus capable of establishing a call with a base station or gateway, but no such call is in-progress. While idle and operating in the slotted paging mode, WCD 128 enters and remains in a "sleep" state (also referred to as a sleep cycle) during all of the non-assigned slots of paging signal 208.

With reference to FIG. 4, WCD 128 is in the sleep state during time periods 406a, 406b, and 406c corresponding to time slots of paging signal 208 that are not assigned to WCD 128 (that is, corresponding to unassigned time slots). The sleep state reduces power consumption in the WCD by entering a power saving mode, which may include removing power from one or more components of the WCD, such as those components used to transmit signals to and receive signals from the gateway. While in the sleep state, the WCD neither receives the pilot signal nor demodulates the paging signal. However, to maintain time synchronization, a clock or timer (for example, timer 316) internal to the WCD maintains time.

When it is time to monitor the assigned slot, for example, slot A or B, WCD 128 transitions from the sleep state to an "awake" state (also referred to as an awake cycle) in order to receive and demodulate the paging signal (for example, a paging message included in the paging signal) during the assigned slot. With reference to FIG. 4, the WCD is in the awake state during time periods 410a and 410b corresponding to respective assigned slots A and B. When the period of time corresponding to the assigned slot has elapsed, the WCD transitions from the awake state back into the sleep state. In this way, the WCD repetitively cycles between the sleep and awake states while operating in the slotted paging mode.

V. Methods

Figure 5:
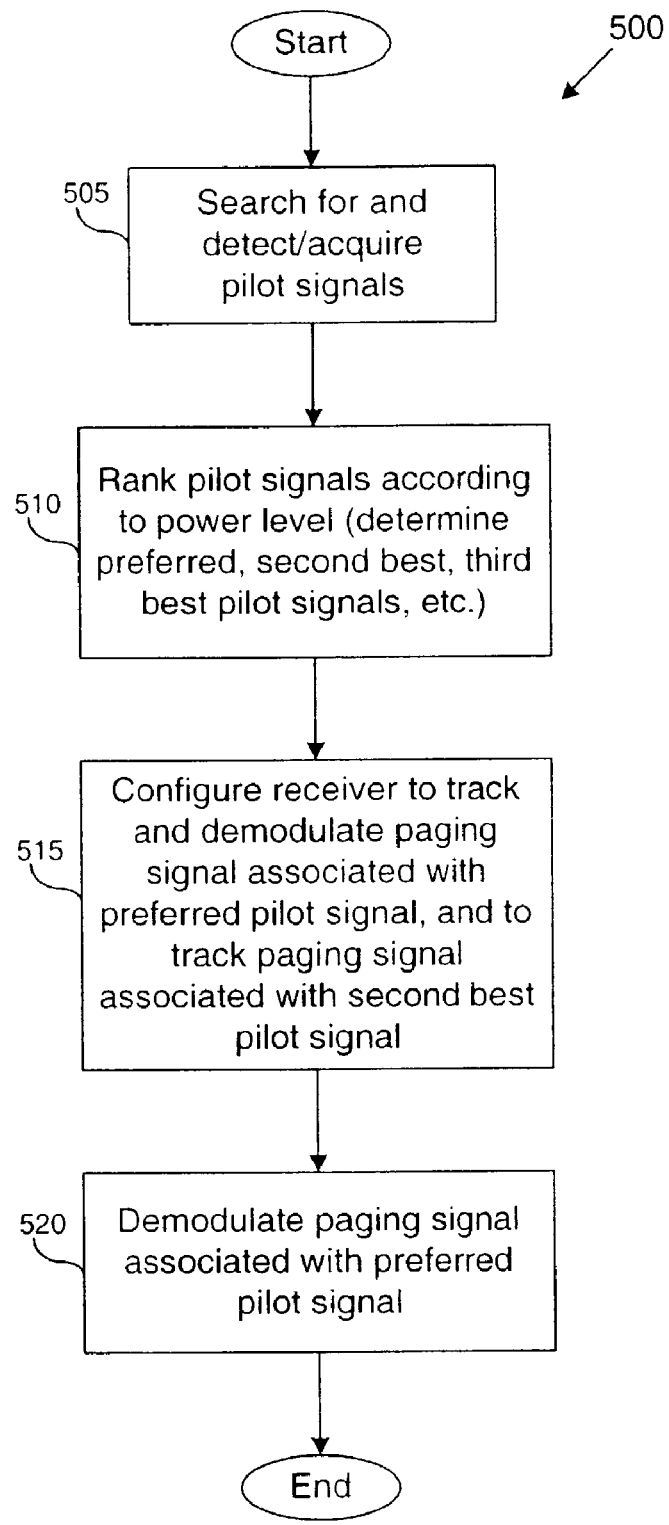
FIG. 5 is a flow chart of an example method that may be performed by the receiver of FIG. 3 as part of acquiring a communication link with a system, or during slotted mode operation.

FIG. 5 is a flow chart of an example method 500 that may be performed by receiver 300 as part of acquiring a communication system. Method 500 may also be performed while receiver 300 is in the awake state and monitoring an assigned slot (for example, slot A) for paging messages. Receiver 300 may perform method 500 as a precursor to performing either of the methods of the present invention, described below in connection with FIGS. 6 and 7.

At a first step 505 of method 500, searcher 308 acquires one or more pilot signals being received by WCD 128. Searcher 308 determines a power level of each acquired pilot signal during this pilot acquisition process. To acquire (and reacquire) a pilot signal, searcher 308 searches within signal 306 for the pilot signal according to a predefined search window. The search window defines, for example, a code used to spread the pilot signal to be acquired, a range of code phase offsets to be searched, and a range of frequency offsets (for example, doppler frequency offsets) to be searched. Each such window is sometimes referred to as comprising hypothesis for each parameter being searched (code, offset, frequency). Acquiring (and reacquiring) a pilot signal using the search window includes the following exemplary steps:

(a) correlating signal 306 with the code associated with the pilot signal (that is, used to spread the pilot signal) to be acquired, at different PN code phase offsets;

(b) integrating energy, produced by correlating, for each of the different code phase offsets; and (c) determining whether the integrated energy for each of the code offsets exceeds a predetermined threshold, in order to identify (or at least begin to identify) an optimal, or most likely or probable code phase offset.

The above steps enable searcher 308 to identify (or at least begin to identify) the most likely or probable code phase offset of the pilot signal, and thereby initially synchronize receiver 300 to the code used to spread the pilot signal.

Assuming at least two pilot signals are acquired in step 505, at a next step 510, searcher 308 ranks the at least two acquired pilot signals according to their power levels. That is, searcher 308 determines a best or preferred pilot signal having a highest power level among the acquired pilot signals, and a second best pilot signal having the next highest power level among the acquired pilot signal, and so on. Searcher 308 reports results from steps 505 and 510, such as pilot signal power levels and/or rankings, to controller 312.

At a next step 515, controller 312 configures receiver 300 to track and demodulate certain signals in accordance with the results reported by searcher 308. For example, controller 312 configures a first one of fingers 310 (for example, finger 310a) to track and partially despread a paging signal associated with the preferred pilot signal. Controller 312 also configures a second one of fingers 310 (for example, finger 310b) to track and partially despread a second paging signal associated with the second best pilot signal. In response, the first and second fingers respectively track and partially despread the preferred paging signal and the second best paging signal, to respectively produce first and second finger output signals (for example, signals 320a and 320b). A finger uses a designated code to track and partially despread a designated signal, such as a paging signal, that is spread using the designated code. The finger tracks a code phase offset of the designated signal, a frequency offset (for example, a doppler frequency offset) of the designated signal, and a timing offset of the designated signal.

In step 515, controller 312 also configures selector 322 to route the output signal produced by the first finger (for example, signal 320a) to demodulator 326, since the first finger is tracking the paging signal associated with the preferred pilot signal. Controller 312 also configures demodulator 326 to demodulate the first paging signal.

Figure 6:
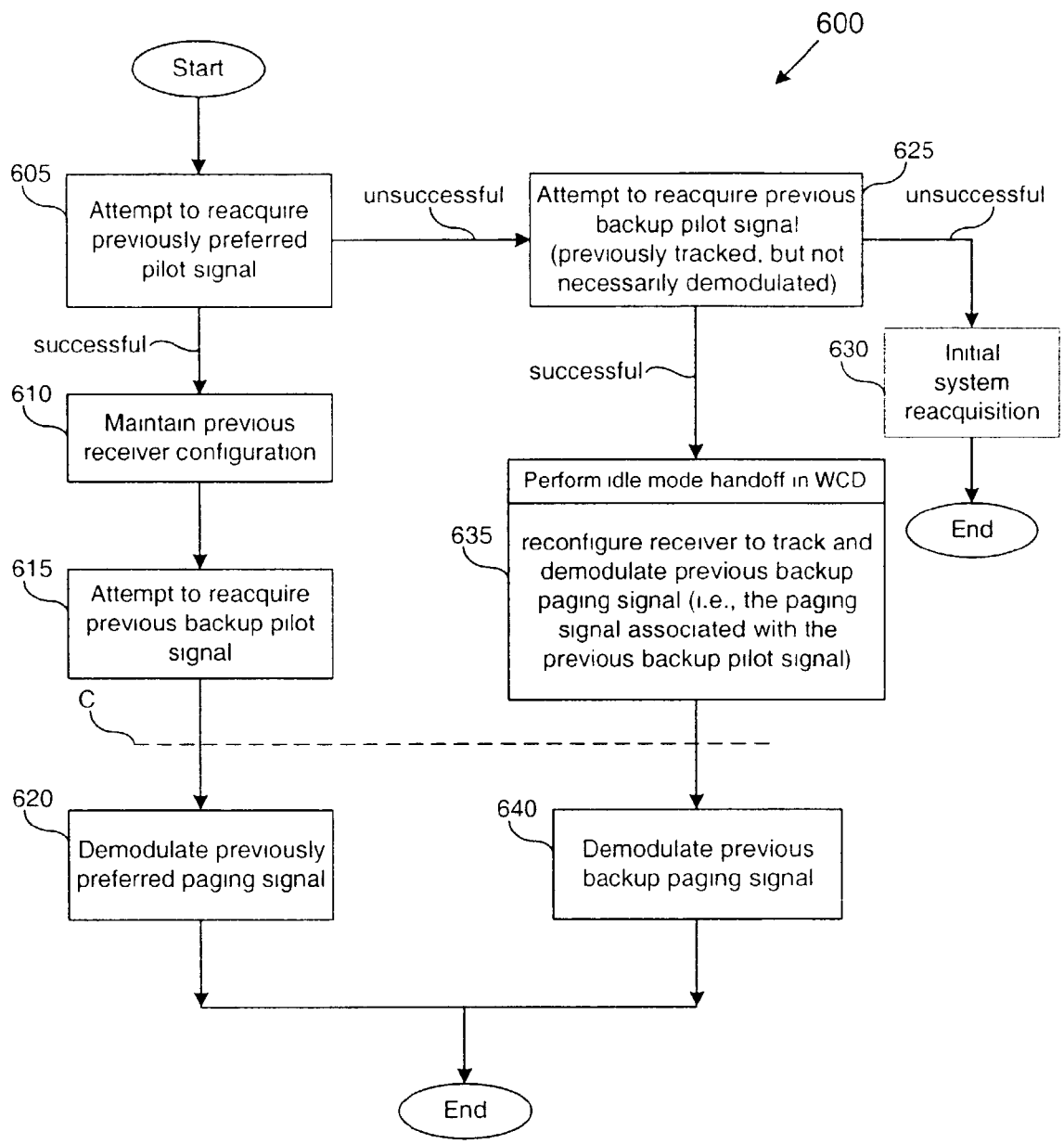
FIG. 6 is a flow chart of a method of performing an idle mode handoff between signals in the WCD of FIG. 1, while the WCD is idle and operating in the slotted paging mode, according to an embodiment.

At a next step 520, demodulator 326 demodulates the output signal of the first finger, to produce a demodulated signal (for example, a demodulated paging signal). Demodulator 326 may use a designated code associated with the signal to be demodulated to perform further de-spreading of the designated signal. For example a PN code, or an orthogonal channelizing or covering code FIG. 6 is a flow chart of an example method 600 of performing an idle mode handoff between signals in receiver 300 of WCD 128, while the WCD is idle and operating in the slotted paging mode. Since the handoff is performed in receiver 300 while WCD 128 is idle, the handoff is referred to as an "idle mode handoff."

It is assumed the following conditions exist before method 600 is initiated. First, it is assumed receiver 300 had acquired a preferred pilot signal and a next best pilot signal, and had configured itself to demodulate the paging signal associated with the preferred pilot signal and track the paging signal associated with the next best pilot signal, during an awake cycle occurring before method 600 is initiated. The awake cycle occurring before method 600 is initiated is referred to as a previous awake cycle, and thus, the preferred pilot signal and next best pilot signal acquired during the previous awake cycle are similarly referred to as previously preferred and previous next best pilot signals. Method 500 can be executed in WCD 128 to establish the above-mentioned conditions.

Second, it is assumed that WCD 128 is in a sleep state just before method 600 is initiated.

In initial step 605 of method 600, searcher 308 attempts to reacquire the previously preferred pilot signal. In other words, searcher 308 attempts to reacquire the pilot signal associated with the paging signal the WCD was demodulating during the previous awake state.

If searcher 308 successfully reacquires the previously preferred pilot signal, then the process or method proceeds to step 610. At step 610, controller 312 maintains the same receiver configuration used during the previous awake state, thereby enabling the receiver to continue to track and demodulate the paging signal associated with the previously preferred pilot signal.

At next step 615, searcher 308 attempts to reacquire the previous next best pilot signal (also referred to as the previous backup pilot signal).

At a next step 620, demodulator 316 demodulates the previously preferred paging signal.

Returning again to initial step 605, if the attempt to reacquire the previously preferred pilot signal is unsuccessful, that is, the previously preferred pilot signal cannot be reacquired, processing of the method proceeds to step 625. Failure to reacquire the previously preferred pilot signal may be caused by a signal blockage, or because the WCD is no longer within a zone of coverage associated with the previously preferred pilot signal. At step 625, searcher 308 attempts to reacquire the previous backup pilot signal. If the previous backup pilot signal cannot be reacquired, this means that neither the previously preferred pilot signal nor the previous backup pilot signal are able to be reacquired, and the process proceeds to a step 630 for initial system reacquisition.

On the other hand, if the previous backup pilot signal is successfully acquired at step 625, processing proceeds to step 635. At step 635, an idle mode handoff operation is performed in WCD 128. To effect the idle mode handoff, controller 312 reconfigures receiver 300 to track and demodulate the previous backup paging signal (that is, the paging signal associated with the previous backup pilot signal). For example, controller 308 reconfigures selector 322 and demodulator 326 so that the previous backup paging signal can be demodulated instead of the paging signal associated with the previously preferred paging signal.

At a next step 640, the previous backup paging signal is demodulated. WCD 128 uses the idle mode handoff to achieve seamless paging coverage in the event a signal blockage occurs relative to the first paging signal, or when the WCD moves out-of-range with respect to the first paging signal.

Method 600 is further illustrated by way of the following example. With reference again to FIG. 4, assume in the example that:

1. During awake cycle period 410a (representing the previous awake cycle), WCD 128 receives a first set of forward link signals associated with a first beam B1 from a first satellite S1, and a second set of forward link signals associated with a second beam B2 of a second satellite S2;

2. During awake cycle period 410a, WCD 128 performs method 500 to establish the pilot signal associated with the first set of signals (of beam B1) as the preferred pilot signal and the pilot signal associated with the second set of signals (of beam B2) as the next best (that is, backup) pilot signal, whereby the first set of signals is designated a preferred set of signals and the second set of signals is designated as a next best (that is, backup) set of signals;

3. At the end of awake cycle period 410a, finger 310a is configured to track signals within the first set of signals, finger 310b is configured to track signals within the second set of signals, and selector 322 is selected to route signal 320a from finger element 310a to demodulator 326, whereby demodulator 326 demodulates signals within the first set of signals;

4. WCD 128 transitions from the awake cycle corresponding to time period 410a, to the sleep cycle corresponding to time period 406b; and 5. WCD 128 performs method 600 while transitioning from the sleep cycle corresponding to time period 406b, to the awake cycle corresponding to time period 410b (representing a current awake cycle).

Assume at initial step 605, searcher 308 is unable to reacquire the pilot signal associated with the first set of signals (of beam B1). Also, assume at step 625, searcher 308 acquires the pilot signal associated with beam B2. Under such circumstances, WCD 128 performs the idle mode handoff of step 635 from the first set of signals (that is, from beam B1) to the second set of signals (that is, to beam B2), thereby enabling the WCD to demodulate the paging signal associated with the second set of signals (of beam B2). For example, controller 312 reconfigures selector 322 to route signal 320b, instead of signal 320a, to demodulator 326, whereby the demodulator demodulates the paging signal associated with beam B2.

Figure 7:
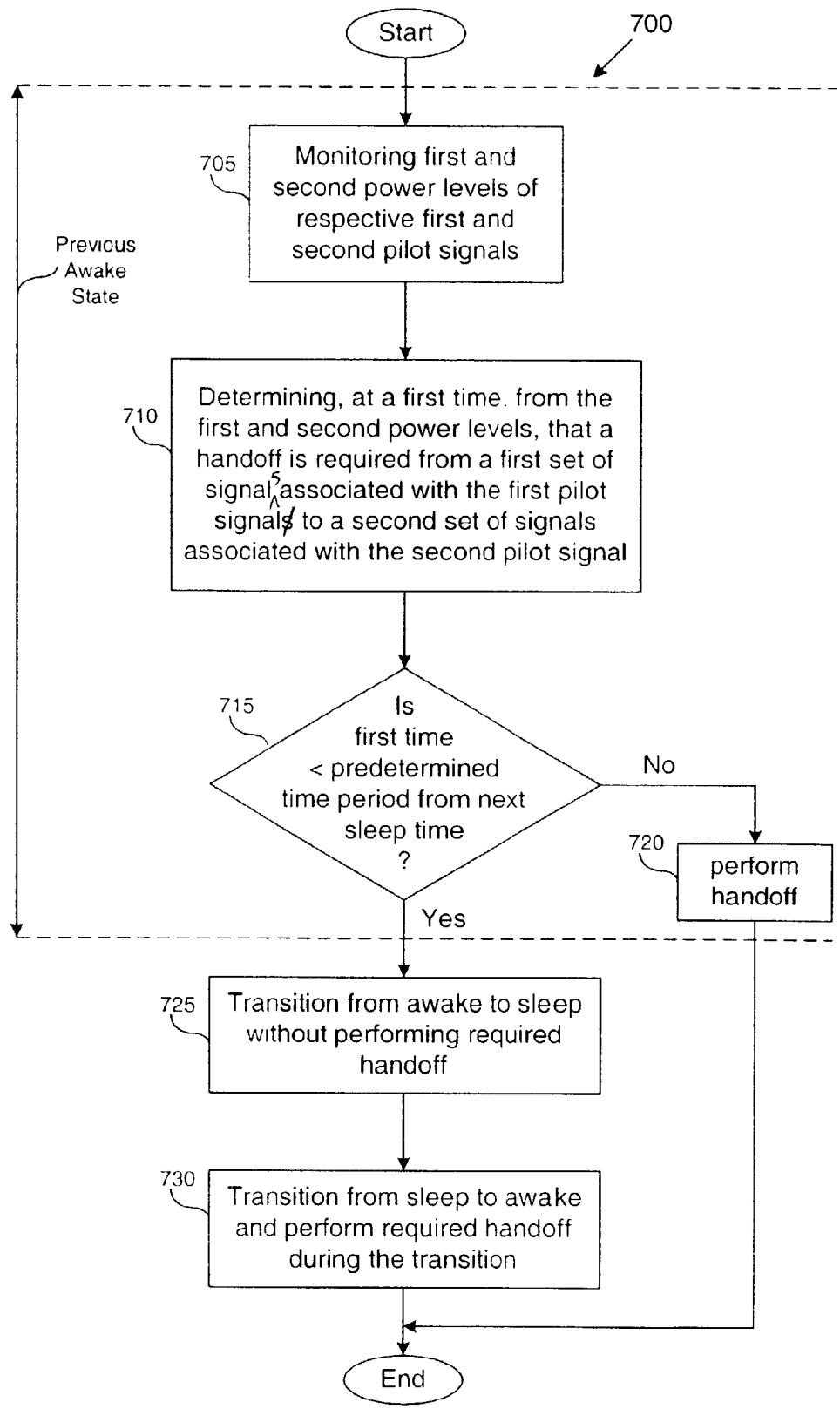
FIG. 7 is a flowchart of a method of performing an idle mode handoff in the WCD of FIG. 1, while the WCD is idle and operating in the slotted paging mode, according to another embodiment.

FIG. 7 is a flowchart of an example method 700 of performing an idle mode handoff in WCD 128, according to another embodiment of the present invention. An idle mode handoff operation, for example, as described above in correction with FIG. 6, takes a finite amount of time to execute. According to method 700, the idle mode handoff is only initiated during an awake cycle only when predetermined conditions apply. Otherwise, the handoff is deferred, that is, postponed, until the beginning of a next awake cycle. This can advantageously shorten the awake cycle to conserve power. Also, this method can prevent a handoff from interfering with, and possibly extending, the scheduled end of an awake cycle, thereby conserving power.

Method 700 spans at least two awake cycles of WCD 128, whereby steps 705, 710, 715, and 720 are performed during a current awake cycle and step 730 is performed during a next awake cycle. It is assumed a preferred pilot signal and a backup pilot signal have already been established before method 700 is initiated.

At initial step 705, searcher 308 monitors a first power level of the preferred pilot signal and a second power level of the backup pilot signal. At a next step 710, the searcher/controller 312 determines based on the first and second power levels from step 705, that a handoff from a first set of forward link signals associated with the first pilot signal to a second set of signals forward link signals associated with the second pilot signal is required. For example, receiver 300 can determine the handoff is required when the power level of the backup pilot signal exceeds the power level of the preferred pilot signal by a predetermined amount.

At next decision step 715, controller 312 determines whether the required handoff can be postponed until the next awake cycle. If the handoff can be postponed, then processing proceeds to a step 725. At step 725, WCD 128 transitions from the awake state to the sleep state without performing the required handoff.

In a next step 730, WCD transitions from the sleep state to the awake state and performs the required handoff during the transition, or after the transition. For example, WCD 128 can transition from the sleep state to the awake state, and then perform the required handoff immediately after the transition. The handoff mentioned in step 725 and 730, is similar to the handoff performed in step 635 in that receiver 300 of WCD 128 is reconfigured to demodulate the paging signal associated with the second pilot signal. In one arrangement of the embodiments, the second paging signal, like the first paging signal, is a slotted paging signal associated with a cycle of time slots that is assigned to the WCD, and the WCD transitions from the sleep state to the next awake state so that the next awake state overlaps in time with a time slot of the cycle of time slots.

Step 715 above (that is, the step of determining whether the required handoff can be postponed) can be performed in accordance with different arrangements or embodiments of the invention. In a first example arrangement, it is assumed that in step 710, it is determined that the handoff is required at a first time $t_H$. It is also assumed that WCD 128 is scheduled to go to sleep (from the current awake state) at a scheduled time $t_S$. Operating under these assumptions, step 715 includes determining whether the first time $t_H$ (from step 710) is less than a predetermined time period before the scheduled time $t_S$ (when WCD 128 is to go to sleep). The predetermined time period is selected to be less than or equal to a time period required to perform the handoff (that is, the finite amount of time it takes to execute the handoff). If the first time $t_H$ occurs before (that is, precedes) the scheduled time $t_S$ by less than the predetermined time period, then the handoff is postponed, and processing proceeds to step 725. This prevents the handoff from potentially interfering with, and possibly extending, the scheduled end of the current awake cycle.

In a second example arrangement, step 715 includes determining during the current awake cycle whether a paging slot message, associated with the paging signal being received in the current awake cycle, has been demodulated completely. If the paging slot message has been demodulated completely, and thus captured by WCD 128, then the WCD need no longer remain in the awake state. Thus, processing proceeds to step 725, and WCD 128 transitions from the awake state to the sleep state without performing the required handoff since the paging slot message has been captured.

VI. WCD Computer Controller

Features of the present invention can be performed and/or controlled by processor/controller 312, which in effect comprises a computer system. Such a computer system includes, for example, one or more processors and/or circuits or logic elements that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory and/or other memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system. The secondary memory may also include fixed memory, such as FLASH memory.

The computer system can also include a communications interface. The communications interface allows software and data to be transferred between the computer system and external devices. Software and data transferred via the communications interface are in the form of signals that can be electronic, electromagnetic, optical or other signals capable of being received by the communications interface. As depicted in FIG. 3, processor 312 is in communications with memory 314 for storing information. Processor 312, together with the other components of receiver 300 discussed in connection with FIG. 3, performs the methods of the present invention.

In this document, the terms "computer program medium" and "computer usable medium" are used to generally refer to media such as a removable storage device, a removable memory chip (such as an EPROM, or PROM) within WCD 128, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example, features of the flow charts depicted in FIGS. 5, 6, and 7, can be implemented in such computer programs. In particular, the computer programs, when executed, enable processor 312 to perform and/or cause the performance of features of the present invention. Accordingly, such computer programs represent controllers of the computer system of WCD 128, and thus, controllers of the WCD. Thus, such computer programs control, for example, the idle mode handoff operations of WCD 128, as described above.

Where the invention is implemented using software, the software can be stored in a computer program product and loaded into the computer system using the removable storage drive, the memory chips or the communications interface. The control logic (software), when executed by processor 312, causes processor 312 to perform certain functions of the invention as described herein.

Features of the invention may also or alternatively be implemented primarily in hardware using, for example, hardware components such as application specific integrated circuits (ASICs). Implementation of the hardware state machine so as to perform the functions described herein will be apparent to persons skilled in the relevant art(s).

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

VII. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What we claim as our invention is:

1. A method of performing a handoff operation in a Wireless Communication Device (WCD) operating in a communication system, the WCD operating in an idle mode wherein the WCD transitions between a sleep state to conserve power and an awake state to receive one or more paging signals, comprising:
   a. determining during an awake state that a handoff from a first paging signal to a second paging signal is required;
   b. determining during the awake state whether to postpone the handoff until a next awake state; and
   c. transitioning from the awake state to a sleep state without performing the required handoff when it is determined to postpone the handoff,
   wherein the WCD is scheduled to transition from the awake state to the sleep state at a scheduled time, and wherein:
   step (a) comprises determining at a first time during the awake state that the handoff is required;
   step (b) comprises determining whether the first time precedes the scheduled time by less than a predetermined time period; and
   step (c) comprises transitioning from the awake state to the sleep state at the scheduled time without performing the required handoff when it is determined that the first time proceeds the scheduled time by less than the predetermined time period.

2. The method of claim 1, wherein during a previous awake state, a preferred pilot signal and a next best pilot signal had been acquire, wherein step (a) further comprises:
   attempting to reacquire only the preferred pilot signal and the next best pilot signal, wherein the preferred pilot signal is associated with a first paging signal that was being demodulated during a the previous awake state and wherein attempting to reacquire the next best pilot signal is associated with a second paging signal that was being tracked during the previous awake state;
   determining that the handoff is required when the attempt to reacquire the preferred pilot signal fails and the attempt to reacquire the next best pilot signal is successful.

3. The method of claim 2, wherein the first and second paging signals are slotted paging signals associated with a predetermined cycle of time slots, and said step of transitioning from the previous sleep state to the current awake state comprises transitioning to the current awake state so that the current awake state overlaps in time with a time slot of the cycle of time slots that is assigned to the WCD.

4. The method of claim 2, wherein the communication system is a Code Division Multiple Access (CDMA) communication system, and wherein the first pilot signal is spread using a first code and the second pilot signal is spread using a second code, the second code being either a different code from the first code or a time shifted version of the first code, and wherein:
   the attempting to reacquire the preferred pilot signal further comprises attempting using the first code; and
   the attempting to reacquire the next best pilot signal further comprises attempting using the second code.

5. The method of claim 4, wherein the second paging signal is spread using a third code related to the second code, and wherein the performing of the handoff comprises demodulating the second paging signal using the third code.

6. The method of claim 2, wherein the WCD includes a receiver that was configured to demodulate the first paging signal during the previous awake state, and wherein the performing of the handoff comprises reconfiguring the WCD to demodulate the second paging signal.

7. The method of claim 1, further comprising:
d. performing the required handoff from the first paging signal to the second paging signal after the WCD transitions from the sleep state to the next awake state; and
e. demodulating the second paging signal during the next awake state as a result of step (d).

8. The method of claim 1, wherein the communication system is a Code Division Multiple Access (CDMA) communication system and the second paging signal is a spread spectrum signal, and step (e) comprises despreading the second paging signal using a code.

9. The method of claim 1, further comprising:
prior to step (a), monitoring a first power level of a first pilot signal associated with the first paging signal and a second power level of a second pilot signal associated with the second paging signal; and
wherein step (a) comprises determining the handoff is required based on the first and second power levels.

10. The method of claim 9, wherein step (a) further comprises determining the handoff is required when the second power level is greater than the first power level by a predetermined amount.

11. The method of claim 1, wherein the predetermined time period is less than a time period required to perform the required handoff.

12. The method of claim 1, wherein:
step (b) comprises determining whether a paging slot message associated with the paging signal has been demodulated; and
step (c) comprises transitioning from the awake state to the sleep state without performing the required handoff when it is determined that the paging slot message associated with the paging signal has been demodulated.

13. An apparatus for performing a handoff operation in a Wireless Communication Device (WCD) operating in a communication system, the WCD operating in an idle mode wherein the WCD transitions between a sleep state to conserve power and an awake state to receive one or more paging signals, comprising;
first means for determining during an awake state that a handoff from a first paging signal to a second paging signal is required;
second means for determining during the awake state whether to postpone the handoff until a next awake state; and
third means for transitioning from the awake state to a sleep state without performing the required handoff when it is determined to postpone the handoff,
wherein the WCD is scheduled to transition from the awake state to the sleep state at a scheduled time, and wherein:
the first means comprises means for determining at a first time during the awake state that the handoff is required;
the second means comprises means for determining whether the first time precedes the scheduled time by less than a predetermined time period; and
the third means comprises means for transitioning from the awake state to the sleep state at the scheduled time without performing the required handoff when it is determined that the first time precedes the scheduled time by less than the predetermined time period.

14. The apparatus of claim 13, wherein during a previous awake state, a preferred pilot signal and a next best pilot signal had been acquired, wherein the first means for determining during an awake state that a handoff from a first paging signal to a second paging signal is required further comprises:
means for attempting to reacquire only the preferred pilot signal and the next best pilot signal, wherein the preferred pilot signal is associated with a first paging signal that was being demodulated during the previous awake state, wherein the next best pilot signal is associated with a second paging signal that was being tracked during the previous awake state; and
wherein the first means for determines the handoff is required when the attempt to reacquire the preferred pilot signal fails and the attempt to reacquire the next best pilot signal is successful.

15. The apparatus of claim 14, wherein the first and second paging signals are slotted paging signals associated with a predetermined cycle of time slots, and the WCD transitions from the previous sleep state to the current awake state so that the current awake state overlaps in time with a time slot of the cycle of time slots that is assigned to the WCD.

16. The apparatus of claim 14, wherein the communication system is a Code Division Multiple Access (CDMA) communication system, and wherein the fist pilot signal is spread using a first code and the second pilot signal is spread using a second code, the second code being either a different code from the first code or a time shifted version of the first code, and wherein;
the means for attempting to reacquire includes means for attempting to reacquire the preferred pilot signal using the first code and for attempting to reacquire the next best pilot signal using the second code.

17. The apparatus of claim 16, wherein the second paging signal is spread using a third code related to the second code, and wherein the means for demodulating includes means for demodulating the second paging signal using the third code.

18. The apparatus of claim 13, further comprising:
fourth means for performing the required handoff from the first paging signal to the second paging signal after the WCD transitions from the sleep state to a next awake state; and
fifth means for demodulating the second paging signal during the next awake state.

19. The apparatus of claim 13, wherein the communication system is a Code Division Multiple Access (CDMA) communication system and the second paging signal is a spread spectrum signal, the fifth means comprising means for despreading the second paging signal using a code.

20. The apparatus of claim 13, further comprising:
fifth means for monitoring a first power level of a first pilot signal associated with the first paging signal and a second power level of a second pilot signal associated with the second paging signal; and
wherein the first means includes means fur determining the handoff is required based on the first and second power levels.

21. The apparatus of claim 20, wherein the first means further includes means for determining the handoff is required when the second power level is greater than the first power level by a predetermined amount.

22. The apparatus of claim 13, wherein the predetermined time period is less than a time period required to perform the required handoff

23. The apparatus of claim 13, wherein:
the second means comprises means for determining whether a paging slot message associated with the paging signal has been demodulated; and
the third means comprises means for transitioning from the awake state to the sleep state without performing the required handoff when it is determined that the paging slot message associated with the paging signal has been demodulated.

* * * * *